United States Patent [19]

Kerdranvat

[11] Patent Number: 5,351,095
[45] Date of Patent: Sep. 27, 1994

[54] METHOD AND DEVICE FOR ESTIMATING AND HIERARCHICALLY CODING THE MOTION OF SEQUENCES OF IMAGES

[75] Inventor: Michel Kerdranvat, Rennes, France

[73] Assignee: Thomson Consumer Electronics, Courbevoie, France

[21] Appl. No.: 678,278

[22] PCT Filed: Aug. 24, 1990

[86] PCT No.: PCT/FR90/00628

§ 371 Date: Apr. 29, 1991

§ 102(e) Date: Apr. 29, 1991

[87] PCT Pub. No.: WO91/03797

PCT Pub. Date: Mar. 21, 1991

[30] Foreign Application Priority Data

Aug. 29, 1989 [FR] France ............................ 89 11328

[51] Int. Cl.$^5$ ........................................... H04N 7/137
[52] U.S. Cl. ...................... 348/699; 348/407; 348/413; 348/416
[58] Field of Search ............... 358/105, 136, 699, 407, 358/413, 416; H04N 7/137

[56] References Cited

U.S. PATENT DOCUMENTS

| 4,924,310 | 5/1990 | von Brandt | 358/136 |
| 5,150,209 | 9/1992 | Baker | 358/136 |
| 5,155,594 | 10/1992 | Bernstein | 358/136 |

FOREIGN PATENT DOCUMENTS 0293644 12/1988 European Pat. Off. .

OTHER PUBLICATIONS

Strobach, P. : "Quadtree-Structured linear prediction models for image sequence processing", pp. 742–748, *IEEE Transactions on Pattern Analysis and Machine Intelligence*, vol. 11, No. 7, Jul. 1989, New York.

Williams, L. R. et al, "A coarse-to-fine control strategy for stereo and motion on a mesh-connected computer", pp. 219–226, *Proceedings IEEE Computer Society Conference on Computer Vision and Pattern Processing*, Jun. 22–26, 1986, Washington.

Proceedings Workshop on Motion: Representation and Analysis, Charleston, South Carolina May 7–9, 1986, IEEE, (Washington, US), W. Enkelmann: "Investigations of multigrid algorithms for the estimation of optical flow fields in image sequences", pp. 81–87.

*Primary Examiner*—Howard W. Britton
*Attorney, Agent, or Firm*—Oblon, Spivak, McClelland, Maier & Neustadt

[57] ABSTRACT

A method for estimating motion which calculates a priori for a current image a first field of motion for blocks of a first level resulting from a partition of the image into blocks of a so-called maximum size, on the basis of a symmetric estimation algorithm, using the preceding and following images in the sequence to calculate the displaced inter-raster differences. Then, a second field of motion for blocks resulting from the partition of a block of the first level are calculated, and so on until a level of blocks of a minimum size. The final field of motion results from the selection of the most suited motion vectors from those of the various levels and is directly associated with a quadtree coding tree. Such a method finds particular application to image transmission chains, and in particular high-definition.

11 Claims, 7 Drawing Sheets

METHOD AND DEVICE FOR ESTIMATING AND HIERARCHICALLY CODING THE MOTION OF SEQUENCES OF IMAGES

BACKGROUND OF THE INVENTION

1. Field of the Invention

The invention relates to the field of image processing, and more particularly to motion estimation used in image transmission chains with a view, in particular, to reducing the information throughput, and aims at a method and the corresponding device for estimating and hierarchically coding the motion of sequences of images.

2. Discussion of the Background

Motion estimation information is increasingly used in all parts of a high-definition television transmission chain:
at the stage for producing the images;
at the stage for transmitting the images;
and at the stage for receiving these same images.

Thus, motion estimation becomes an important function in the, in particular high-definition, image transmission chain.

Currently, each item of equipment in the transmission chain has its own motion estimator. It therefore seems of great interest to provide a single motion estimator, in the production studio, which is able to feed each item of equipment in the high-definition television chain. But, as each item of equipment does not require the same characteristics for the motion information, the single motion estimator must have several possible outputs, or be parametrizable.

SUMMARY OF THE INVENTION

The aim of the invention is a method and the corresponding device for estimating and coding motion, developed to enable the simple coding of sequences of images, this motion information being exactly suited to a "quadtree" type coding to which, in addition, a throughput adjustment is easily applicable.

Moreover, with the goal of avoiding a motion estimation operation at reception which would increase the complexity of the receiver, this motion information can be transmitted, in particular on an auxiliary digital data transmission channel for assisting the decoding of sequences of images. Several advantages result from an estimation of motion at the production studio:
the first is that the complexity and therefore the performance of the motion estimating system may be higher at the production studio than they could be in an item of receiving equipment; thus, a powerful and solid motion estimator may be constructed;
the second is that, at the production studio, all the information from the sequence of images to be coded is available and that the motion estimation is therefore more powerful;
moreover, a motion estimation performed at the receiving end would be perturbed by transmission noise.

According to the invention, a method for estimating and hierarchically coding the motion of sequences of images, is characterized in that it consists:
at a first level, in partitioning the current image into $2^{p+1} \times 2^{p+1}$ pixel macroblocks and in determining a first field of motion vectors, which is associated with this partition into macroblocks, by using an iterative and recursive estimation algorithm initialized by motion vectors estimated for the preceding image,
then, at a second level, in partitioning into quadrants each of the macroblocks and in determining, for the blocks which result therefrom, a second motion vector field by using the same estimation algorithm but initialized by vectors from the field of motion which was estimated at the preceding level,
then at an ith level, i=3 to p, in partitioning each of the blocks considered at the i−1 level into quadrants and in determining, for the blocks which result therefrom, an ith motion vector field by using the same estimation algorithm initialized by vectors from the field of motion which were estimated at the preceding level, the blocks of minimum size being $2^{l+1} \cdot 2^{l+1}$ pixel blocks,
and in determining a final motion vector field from the p resulting motion vector fields by choosing the lowest level of partition for which the motion vector associated with the corresponding block leads to the minimization of a criterion reflecting the differences of brightness between blocks communicating in the successive images via the estimated displacement vectors.

BRIEF DESCRIPTION OF THE DRAWINGS

The invention will be better understood and other characteristics will emerge with the aid of the description which follows whilst referring to the attached figures.

FIG. 2 illustrates the information used to estimate a field of motion according to the invention;

DESCRIPTION OF THE PREFERRED EMBODIMENTS

A previously described and used method for estimating motion in a sequence of images is succinctly recalled below for the convenience of the subsequent description of the motion estimation according to the invention.

The used motion estimation algorithm has been described, in particular, by A. N. NETRAVALI and J. D. ROBBINS in an article entitled "Motion Compensated Television Coding, part 1", taken from "The Bell System Technical Journal", Vol. 58, no. 3, March 1979.

This algorithm assumes that all the elementary image elements or "pixels" of one and the same block have the same displacement. This algorithm is recursive and uses the field of motion calculated at the preceding iteration for the following iteration on the basis of the Taylor expansion of a quantity which is the sum over a block of the brightness differences of the pixels of two blocks of two consecutive rasters communicating via the displacement estimated at the preceding iteration.

Figures 1, 2A, 2B:
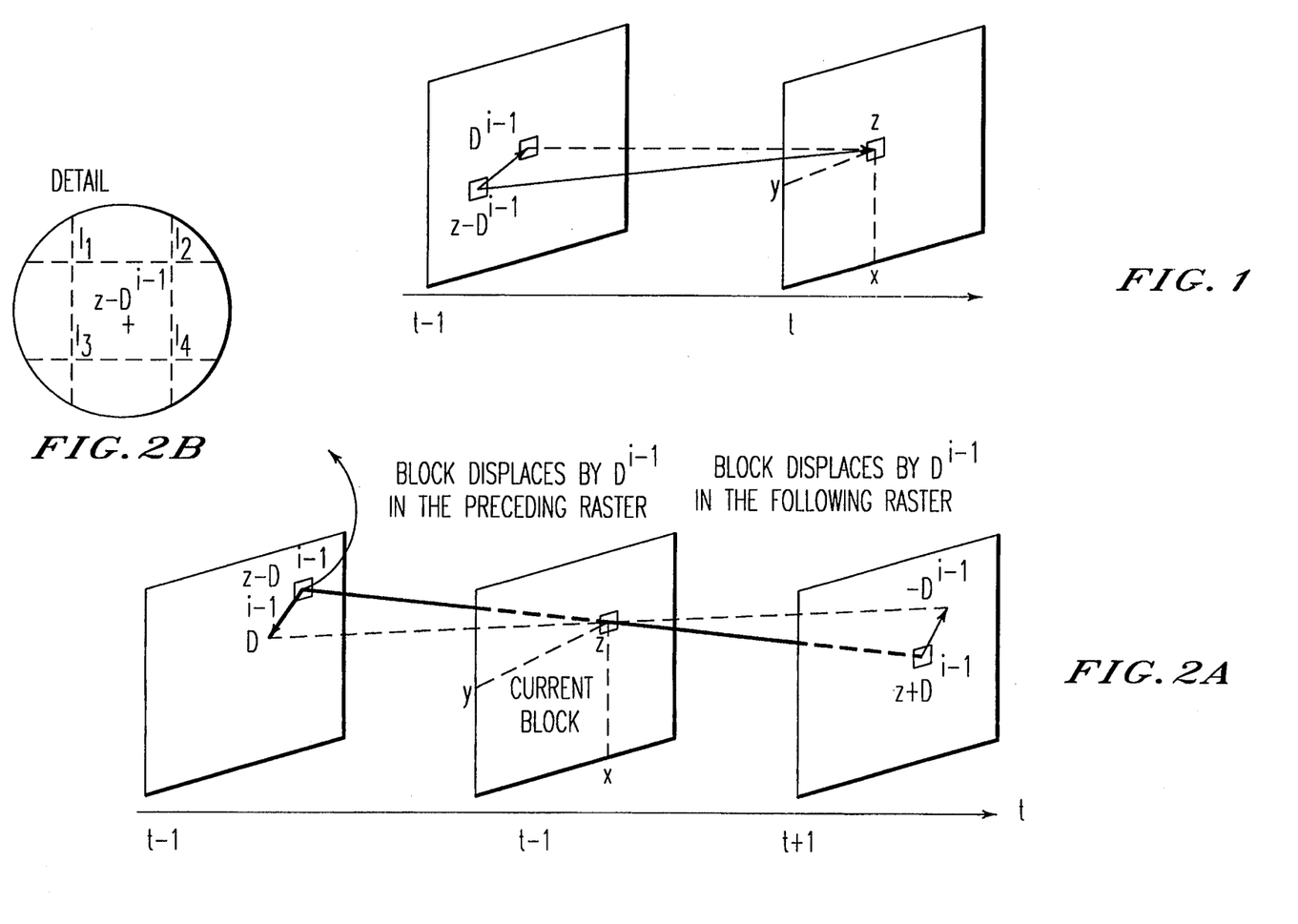
FIG. 1 illustrates the information conventionally used for estimating a field of motion.

Let:
  z(x,y) be the coordinates of a pixel z of the current raster at the instant t,
  I(z,t), the brightness value of a pixel z at the instant t,
  Grad$^x$(z,t) and Grad$^y$(z,t) respectively the horizontal and vertical components of the brightness gradient at the pixel z at the instant t,
  $D_{i-1}$ and $D_i$ the motion vectors with two components $D_ix$ and $D_iy$, $D_{i-1}x$ and $D_{i-1}y$ for a block of pixels, at the iteration i and at the preceding iteration i−1 respectively;
  DFD(z−$D_{i-1}$,t−1) the displaced inter-raster difference for the pixel z, that is to say the difference between the brightness of the pixel z in the current raster at the instant t and the brightness of the displaced pixel corresponding to z in the preceding raster (at the instant t−1), that is to say z displaced by the motion vector $D_{i-1}$ calculated at the preceding iteration:

$$DFD(z-D_{i-1}, t-1) = I(z,t) - I(z-D_{i-1}, t-1)$$

Given these notations as illustrated by FIG. 1, the motion vector of a pixel z at the iteration i, $D_i$, is deduced from the motion vector $D_{i-1}$ at the preceding iteration i−1 via the following formulae in which the summation signs Σ apply to all the pixels z of a block:

$$D_x^i = D_x^{i-1} - \frac{\Sigma DFD(z - D^{i-1}, t - 1)sg(grad^x(z,t))}{\Sigma |grad^x(z,t)|}$$

$$D_y^i = D_y^{i-1} - \frac{\Sigma DFD(z - D^{i-1}, t - 1)sg(grad^y(z,t))}{\Sigma |grad^y(z,t)|}$$

The algorithm used according to the invention is derived from this spatio-temporal algorithm so as to enable a so-called "symmetric" motion estimation. In fact, as indicated above, the formulas recalled lead to the estimation of the motion of the blocks of the current raster at the iteration i from the motions estimated for the same blocks at the iteration i−1 and by calculating the brightness differences between the current block and the corresponding block after displacement in the preceding raster.

A "symmetric" motion estimation according to the invention uses, for estimating the motion in a current raster at the iteration i, the raster preceding the current raster and the following raster. The gradients are calculated in the preceding and following rasters and the displacement vector at the iteration i is then calculated from the displacement vector of the current block estimated at the preceding iteration i−1 via the following equations which take account of the brightness differences between the pixels of the current block and the pixels of the corresponding blocks, which are displaced by this previously estimated vector, on the one hand in the preceding raster and on the other hand in the following raster;

$$D_x^i = D_x^{i-1} - $$

$$\frac{\Sigma[DFD(z - D^{i-1}, t - 1)sg(grad^x(z - D^{i-1}, t - 1)) - DFD(z + D^{i-1}, t + 1)sg(grad^x(z + D^{i-1}, t + 1))]}{\Sigma[grad^x(z - D^{i-1}, t - 1) + grad^x(z + D^{i-1}, t + 1)]}$$

$$D_y^i = D_y^{i-1} - $$

$$\frac{\Sigma[DFD(z - D^{i-1}, t - 1)sg(grad^y(z - D^{i-1}, t - 1)) - DFD(z + D^{i-1}, t + 1)sg(grad^y(z + D^{i-1}, t + 1))]}{\Sigma[grad^y(z - D^{i-1}, t - 1) + grad^y(z + D^{i-1}, t + 1)]}$$

where sg (...) is the notation for "sign of" the quantity which follows.

The components of the vectors may be non-integer components and an interpolation is necessary to calculate the displaced inter-raster difference, DFD, and the gradients. To do this, the four image elements closest to the current image element z are used.

FIG. 2 shows the position of the displaced blocks in the preceding raster and in the following raster, corresponding to a current block for which the displacement vector estimated at the preceding iteration is $D^{i-1}$ from the preceding raster to the current raster, and therefore $-D^{i-1}$ from the following raster to the current raster if symmetric displacements are assumed.

A detail in the neighbourhood of $z-D^{i-1}$ shows that, in general the displacement vector leads to a displaced pixel $z-D^{i-1}$ (or $z+D^{i-1}$) with a position which does not correspond to integer values of x and y. In consequence, the brightness values of the four points of the neighbourhood of $z-D^{i-1}$ (or $z+D^{i-1}$), $I_1$, $I_2$, $I_3$ and $I_4$ are included in the brightness calculations of the displaced pixels and in the calculation of the gradients.

The interpolation of the brightness I is bilinear, that is to say it is a weighted sum of $I_1$, $I_2$, $I_3$ and $I_4$. Let: $\alpha = d(x - D_x^{i-1})$ and $\beta = d(y - D_y^{i-1})$ be the decimal parts of the x and y components of the displacement vector $D^{i-1}$:

$$I(z-D^{i-1}) = (1-\alpha)(1-\beta)I_1 + \alpha(1-\beta)I_2 + (1-\alpha)\beta I_3 + \alpha\beta I_4$$

The same formula is applied for calculating the brightness of the displaced pixel in the following image $I(z+D^{i-1})$ from the brightness values of the neighbourhood of $z+D^{i-1}$.

The gradients are given by:

$$grad^x(z - D^{i-1}, t - 1) = \frac{(I_2 - I_1) + (I_4 - I_3)}{2}$$

$$grad^y(z - D^{i-1}, t - 1) = \frac{(I_3 - I_1) - (I_4 - I_2)}{2}$$

with $I_1$, $I_2$, $I_3$ and $I_4$ at t−1 and similarly for the $z+D^{i-1}$ gradients at t+1.

It is therefore necessary to access 4 points in the preceding image (t−1) and following image (t+1) memories to calculate the brightness of the displaced points and the corresponding gradients.

By way of simplification in the subsequent notations: $I(z-D^{i-1})$ will be denoted I(t−1) and $I(z+D^{i-1})$ will be denoted I(t+1), and similarly grad$^x$(z−$D^{i-1}$,t−1) will be denoted grad$^x$(t+1), grad$^x$(z+$D^{i-1}$, t+1) will be denoted grad$^x$(t+1), the y components being denoted in the same way, and the displaced inter-raster differences being denoted DFD(t−1) and DFD(t+1).

This type of motion estimation algorithm has two critical parameters: the number of iterations enabling the final values to be obtained, and the size of the measurement window or "block":

with the goal of diminishing the number of iterations necessary to obtain the correct displacement vector, spatial or temporal recursion is generally used: for spatial recursion, the displacements calculated in the causal neighbourhood of a current block are the initial values for the following iteration; spatial recursion therefore requires that the calculations of the displacements used as initial values be completed, which leads to difficulties in the implementation. Temporal recursion is not well suited for object borders. In consequence, the recursion implemented according to the invention is a temporal recursion only for the initialization of the estimation of motion for the current image, and a particular spatial recursion which makes it possible to envisage a parallelization of the motion estimation calculations for the current image.

The motion estimation algorithm assumes that a constant translation is involved for all the pixels lying inside a measurement window. An ideal solution would be to have a window of size varying as a function of the size of the image zones under consideration: wide windows could be used for global displacements, of the panoramic or tilting type for example, whilst small windows would be used for object elements of smaller size.

This principle of classifying displacements hierarchically as a function of the size of the moving zones has been studied by several authors, for example by H. BIERLING and R. THOMA in an article entitled "Motion compensating field interpolation using a hierarchically structured displacement estimator" in the journal—Signal Processing, 11, 1986—387-404.

To summarize, the main characteristics thereof are:
at the first level, measurement windows of large size are used for the large displacements or for the constant displacements of large area,
the size of the window decreases from one level to the other and the displacement vectors are updated,
the smallest window corresponds to the most precise field of motion.

Such a hierarchical structure is of interest since it enables the motion estimation to be refined where the motion information has the greatest density.

Generally, the field of motion vectors resulting from an estimation of motion according to one of the known algorithms is formed from constant displacement zones with arbitrary differing sizes, related only to the contents of the image. A conventional hierarchical-type motion estimation such as described above therefore generates fields of motion corresponding to blocks of arbitrary sizes and the problem is then to bring together this various motion information with the goal of obtaining for each raster a field of motion associated with blocks of largest possible sizes, corresponding to constant motion zones. In fact, this approach is close to that used for the construction of a coding tree, in particular for a coding by quadrant or "quadtree" such as described in an article by C. A. SHAFFER and H. SAMET entitled "Optimal quadtree construction algorithm" in —Computer vision graphics and image processing, vol. 37, 402-419, 1987—.

Figures 3, 5B, 5D, 8:
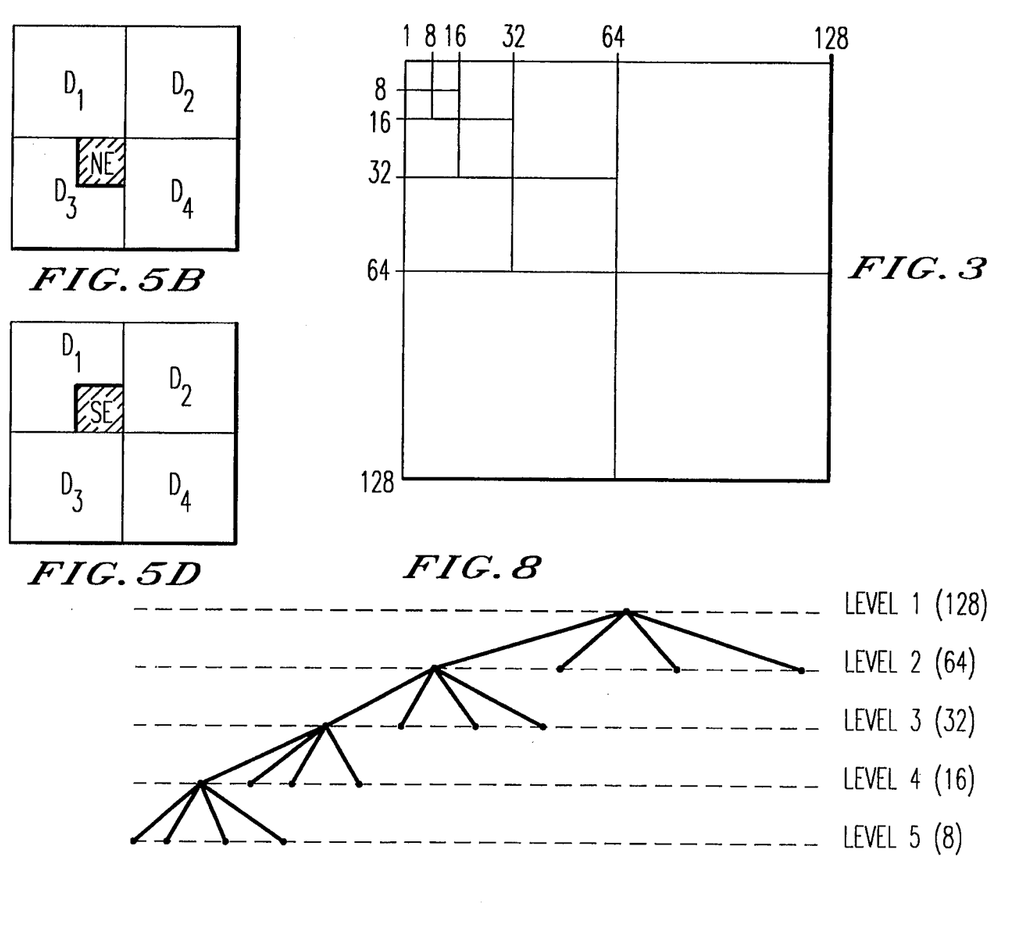
FIG. 3 illustrates the partitioning of a macroblock into smaller blocks in accordance with 5 hierarchical levels.
FIGS. 5a, 5b, 5c and 5d illustrate the displacement vectors of the blocks of the upper level which are adopted as initial values for a block of given level, according to the four possible positions of this latter.
FIG. 8 illustrates the coding tree associated with the partitioning illustrated by FIG. 3.

In consequence, according to the invention, the hierarchical motion estimation method is used to enhance the convergence of the recursive motion estimation algorithm, but it is suited to partitioning into quadrants so as to simultaneously obtain the motion estimation and the corresponding coding of this motion information, in an optimal way. In order to better adapt the motion estimation algorithm to the "quadtree" type coding which will subsequently be done from the resulting field of motion, the blocks of a level are the result of the division into four of a block of the immediately higher level, as shown in FIG. 3 which illustrates the various sizes of blocks resulting from the partition.

Moreover, the recursion is obtained by using the field of motion obtained at a given level of the hierarchy to calculate the field of motion of the immediately lower level; thus, for the calculations within a given level, the motion estimation for a block is independent of that of the other blocks of the neighbourhood at the same level.

Thus, an "a priori" criterion is applied for the calculation of the displacement vectors, with initial values and as will be explained in more detail below, the organization of the levels and the choices of the calculations performed are determined so as to be suited, as far as possible, to the subsequent coding of the resulting field of motion. The description which follows, made with reference to FIG. 4, specifies the chaining of the various steps of the motion estimation and of the associated coding, in an embodiment of the invention.

The maximum size of the image element blocks which is recognized for the coding being $128 \times 128$ pixels, and the minimum size being $8 \times 8$ through successive divisions of each block into 4 quadrants, the a priori calculation of the displacement vectors is performed, according to the invention, firstly for blocks of $128 \times 128$ pixels (level 1), then of $64 \times 64$ (level 2) then of $32 \times 32$ (level 3), then $16 \times 16$ (level 4) and finally $8 \times 8$ pixels (level 5), independently of the contents of the image. For the initialization of the estimation for the current image, the four initial values for the largest blocks, at the first level ($128 \times 128$), are zero or arbitrary for the first image of the sequence, then equal to the motion vectors of the $64 \times 64$ blocks (resulting from the partition into 4 of the $128 \times 128$ blocks) of the preceding image of the sequence, for the following images. Then the four initial values received for a block of size $n \times n$ come from the preceding level, hence with a $2n \times 2n$ block size. These values are the estimated displacements for the four closest blocks of larger size, as shown in FIGS. 5a, 5b, 5c and 5d in which the four displacement vectors D1, D2, D3 and D4 are adopted during a division of blocks for passing to the following level, according to the position of this block in the block of larger size from which it issues; these positions are respectively marked NW for North-West FIG. 5a, NE for North-East FIG. 5b, SW for South-West FIG. 5c and SE for South-East in FIG. 5d.

Figure 6:
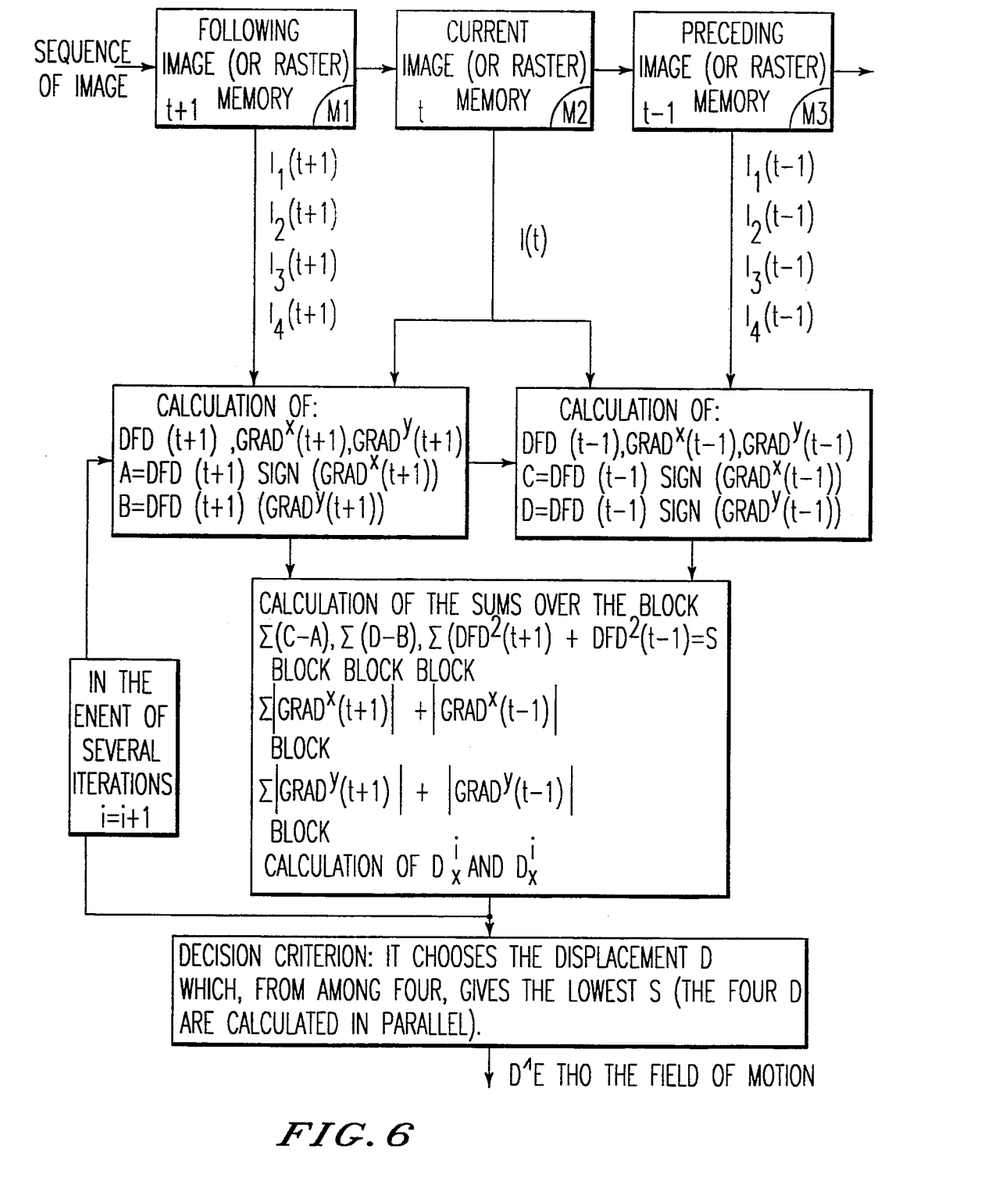
FIG. 6 details the steps of the motion estimation at a given level.

A step of the motion estimation method at a level n is described in more detail below whilst referring to FIG. 6 in which have been represented the three image (or raster) memories (or memory zones) for the following image, $M_1$, (at $t+1$), the current image $M_2$ (at t), and the preceding image $M_3$ (at $t-1$) respectively, as well as the brightness values of the 4 pixels surrounding the displaced pixel $z + D^{i-1}$ at the output of $M_1$, the brightness value $I(t) = I(z,t)$ at the output of $M_2$, and the brightness values of the 4 pixels surrounding the displaced pixel $z - D^{i-1}$ at the output of $M_3$.

A first pointwise calculation step gives the values of the displaced inter-raster differences and of the gradients from the brightness values issuing from the memories and from the initial displacement vectors, with respect to the preceding image t−1, and with respect to the following image at t+1.

The following step then consists in calculating the components of the displacement vector according to the iterative formulae given above, $D_x{}^i$ and $D_y{}^i$, after having calculated the partial sums of the differences such as C-A and D-B over all of the corresponding block of level n.

The four initial values for each current block, corresponding to blocks of the neighbourhood of this current block but of a different level, that is to say of immediately larger size, enable initialization of four separate motion estimations for this block (one only has been shown) and, when the iterative formulae of the algorithm have converged, give four, independent, updated values of motion vectors which complement the values of the vectors of the preceding levels. The squares of the intermediate inter-raster differences DFA used for the updating are calculated, stored in memory and added for the whole block, so as to choose for each block at the end of the 4 calculations, the "best" displacement from the four new updated displacement vectors, that is to say that for which the sum S of the squared inter-raster differences for this block is a minimum. This best vector then constitutes one of the vectors of the field of motion calculated at the level n.

Figure 4:
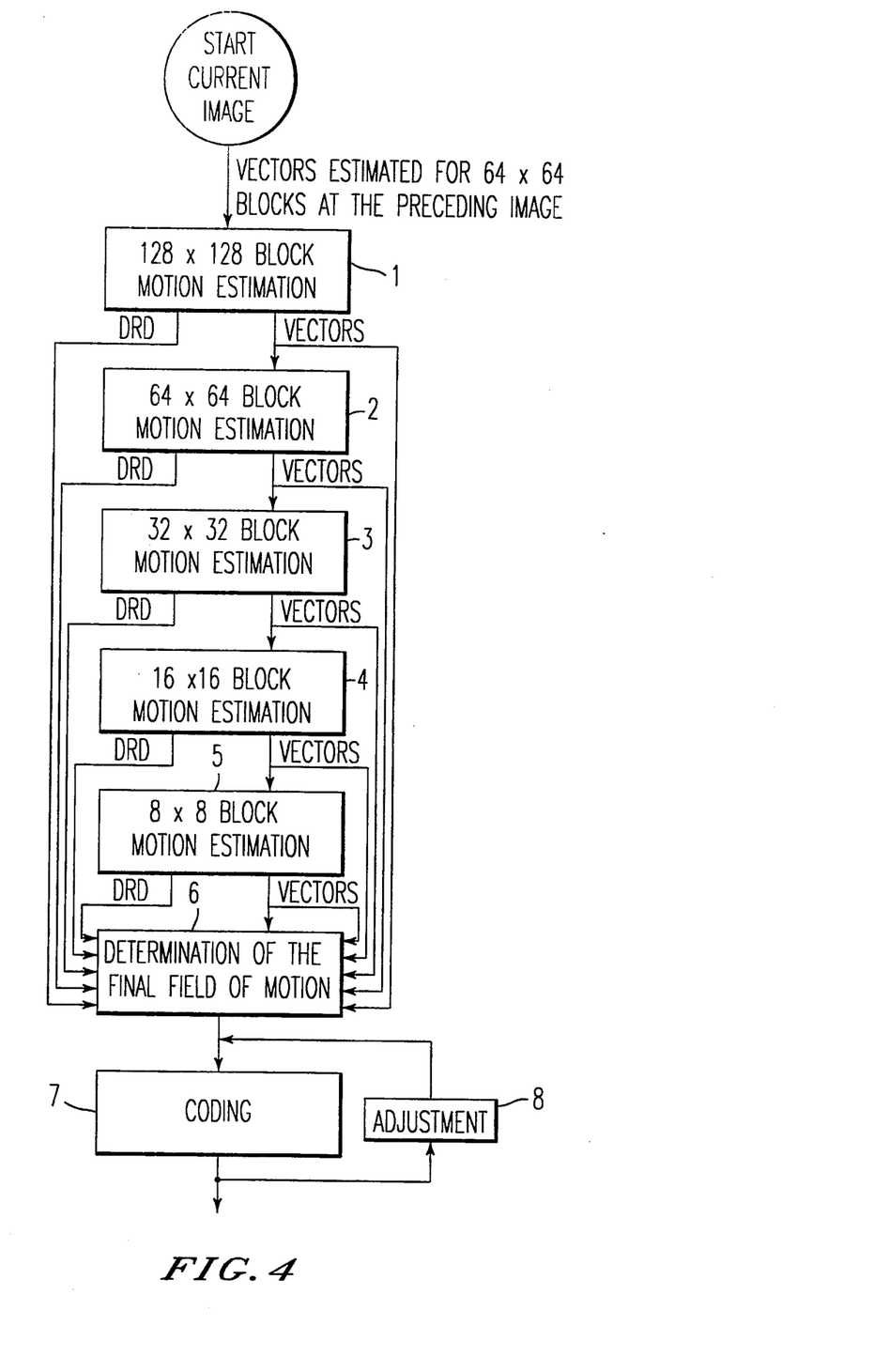
FIG. 4 illustrates the chaining of the steps of the motion estimation method according to the invention.
Figure 5A:
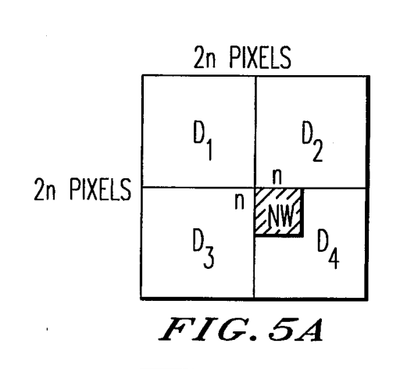
Figure 5C:
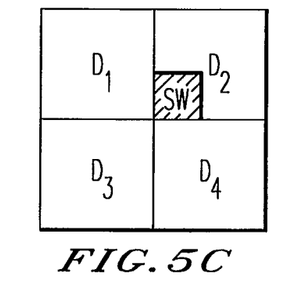

At the end of this a priori determination phase, performed for each of the blocks of the various levels, a different field of motion vector corresponding to each level, that is to say to each size of block, is available to determine the final field of motion suited to the construction of the "quadtree" coding tree (see FIG. 4).

When the size of the blocks decreases, a few divergent mechanisms may intervene if the size of the blocks is too small relative to the brightness information or to the size of the object. But conversely, for small objects or non rectangular objects which are not suited to the initial partitioning into large blocks, the partitioning becomes increasingly more suited when the size of the block decreases. Thus, the correct displacement vector of each zone may be found from among the five available fields of motion for sizes of blocks varying between $128 \times 128$ and $8 \times 8$.

At this stage, the problem is to find the criterion which enables the final field of motion to be determined, step 6 FIG. 4, from the five fields of motion thus calculated, with blocks of largest possible sizes, in order to decrease the coding throughput during the coding performed thereafter.

As indicated above, at each level the sum S over a block of the (squared) displaced inter-raster differences is stored in memory. Thus, for a $128 \times 128$ pixel macroblock, five memory zones contain the squared displaced inter-raster brightness differences, with the associated two-component displacement vectors DV(2).

At the first level, that is to say at the $128 \times 128$ pixel macroblock level, a squared displaced inter-raster difference sum value $S_{128}$ is stored for each block, as well as the corresponding, 2-component displacement vector, $DV_{128}$; at the level 2, each macroblock having been divided into 4 $64 \times 64$ pixel blocks, 4 squared displaced difference sum values $S_{64}$ and four displacement vectors corresponding to two components $DV_{64}$ are stored for each of the macroblocks; etc.; at the level 5, a macroblock having been divided into 256 $8 \times 8$ pixel blocks, a squared displaced difference sum value $S_8$ and a 2-component displacement vector $DV_8$ corresponding to each of the elementary blocks are stored in memory, i.e. 256 values of $S_8$ and 256 two-component vectors $DV_8$ for one macroblock.

Figure 7A:
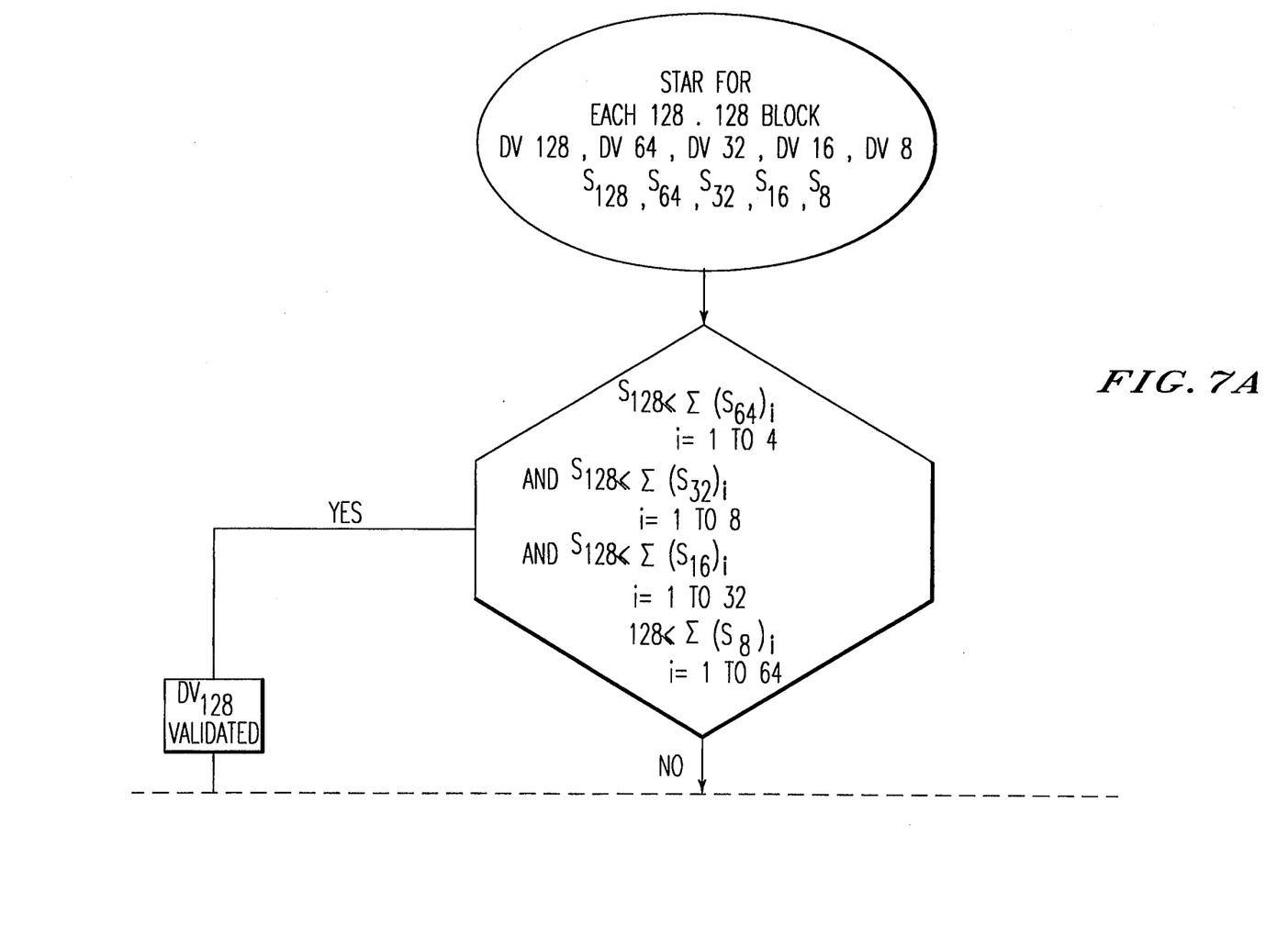
FIG. 7 details the tests applied for determining the final field of motion vectors.
Figure 7B:
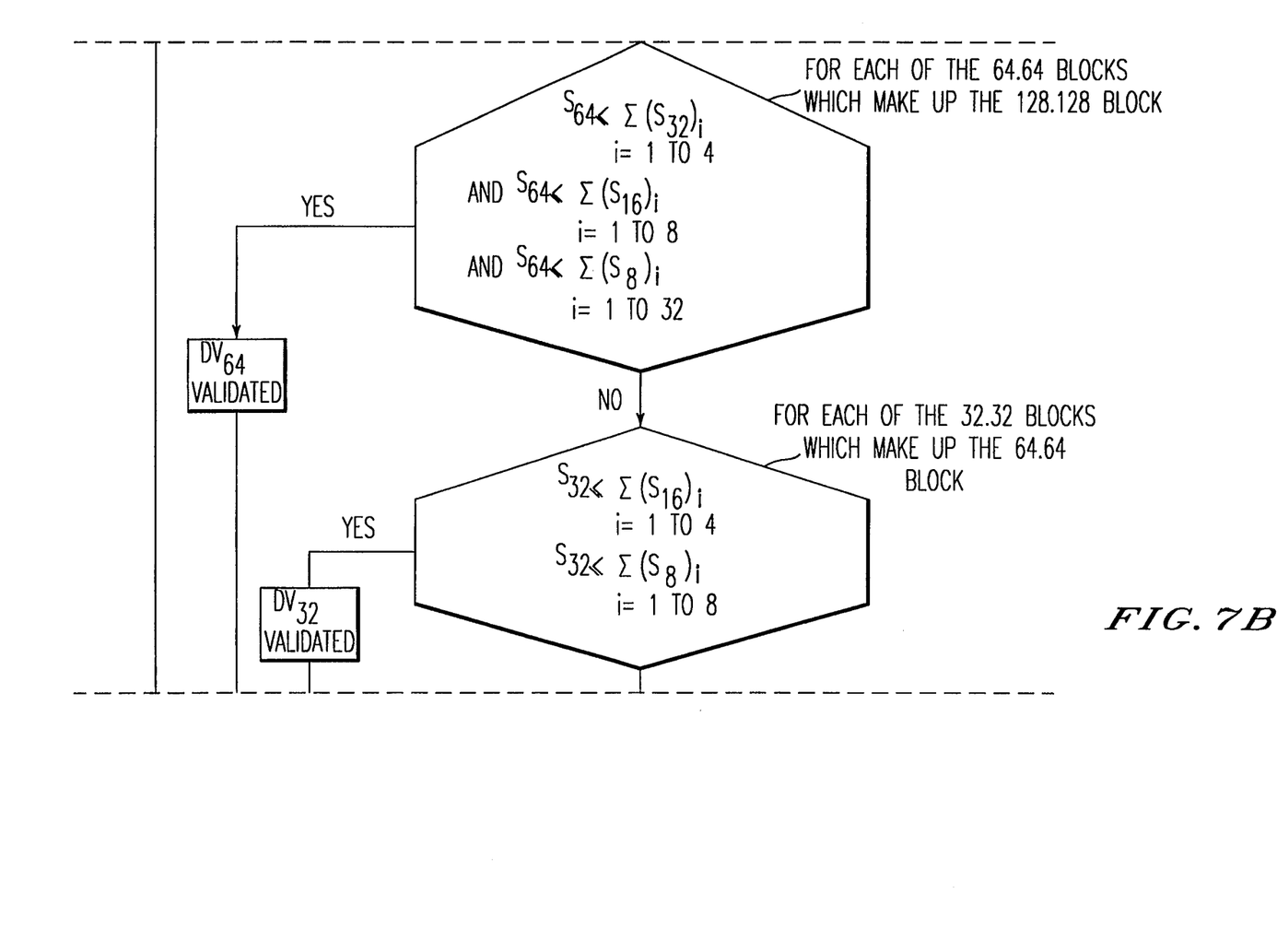
Figure 7C:
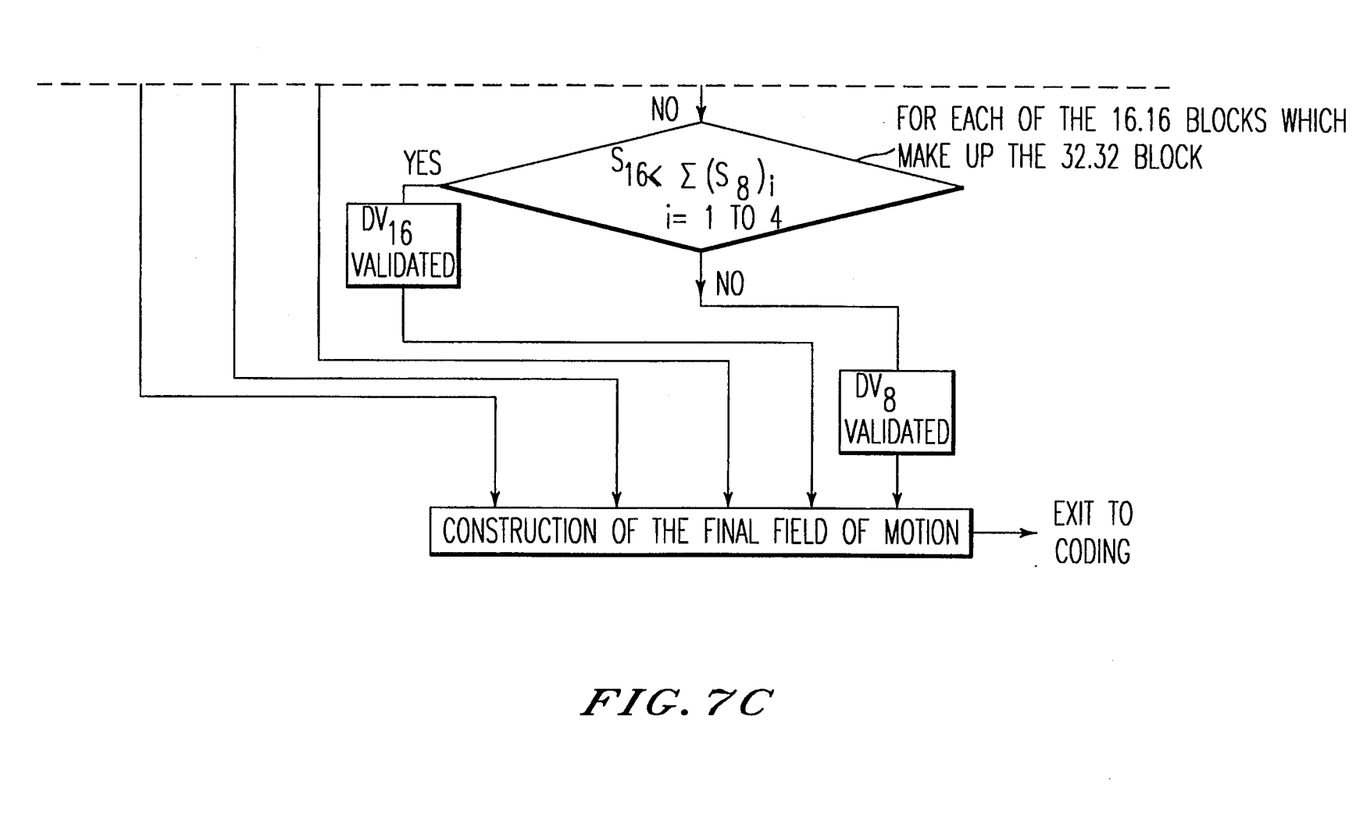

The determination of the field of motion resulting from the 5 fields of motion calculated at these 5 levels is performed in the following way, illustrated by FIG. 7:

The displacement vector $DV_{128}$ is assigned to the $128 \times 128$ macroblock if $S_{128}$ is less than or equal to the sum of the $S_{64}$, to the sum of the $S_{32}$, to the sum of the $S_{16}$ and to the sum of the $S_8$ for the whole of the macroblock.

When the motion vector $DV_{128}$ is not allocated, allocation is tested on the basis of the $64 \times 64$ pixel blocks: a displacement vector $DV_{64}$ is allocated to a $64 \times 64$ block if the value $S_{64}$ is less than or equal to the sum of the $S_{32}$, to the sum of the $S_{16}$, and to the sum of the $S_8$, summed over the corresponding $64 \times 64$ block.

If a displacement vector $DV_{64}$ is not allocated to a $64 \times 64$ block, the displacement vectors of the corresponding $32 \times 32$ element blocks are tested and a displacement vector $DV_{32}$ is allocated to a $32 \times 32$ pixel block if $S_{32}$ is less than or equal to the sum of the $S_{16}$ and to the sum of the $S_8$, respectively summed over the corresponding $32 \times 32$ block.

If a $32 \times 32$ block had no allocated vector, the displacement vectors of the corresponding $16 \times 16$ blocks, $DV_{16}$, are tested. A displacement vector $DV_{16}$ is allocated to a $16 \times 16$ block if the associated $S_{16}$ value is less than or equal to the sum of the four corresponding values of lower level, $S_8$.

If a $16 \times 16$ block had no allocated vector, the displacement vectors $DV_8$ of the final level are allocated to the $8 \times 8$ blocks which make it up.

The final step then applied is the step for "quadtree" coding, 7, and for adjusting the throughput 8 (if necessary), as shown in FIG. 4. Information knowledge decreases the execution time for constructing the coding tree which may thus be less expensive if the motion vectors of elementary blocks are known. Moreover, adjustment of the motion information coding throughput may be easily carried out.

A histogram is compiled of the displacement vector field resulting from the preceding step. The displacement vectors corresponding to peaks of the histogram greater than a given threshold (this threshold corresponding to a motion estimation which is judged to be correct) are chosen. These vectors are transmitted for each raster and the number of them determines the necessary number of bits for a codeword to be able to be assigned to each of them.

The "quadtree" coding is performed on the basis of the $128 \times 128$ macroblocks, and a tree characterizes the partitioning, such as results from the corresponding final field of motion, of each of these macroblocks. In the tree, a node may be a root or a leaf. A special codeword indicates a root, and a leaf corresponds to a displacement vector. The coding throughput for a tree is equal to the number of nodes multiplied by the number of bits of the codewords: for a high-definition image consisting of 1152 lines each having 1440 image elements or pixels, 108 macroblocks enable the whole of the image to be covered.

A procedure for adjusting the coding throughput may be performed easily by eliminating the least probable motion vectors, or in more abrupt fashion, by ceasing the division of the blocks at the minimum dimension 16×16 for example.

FIG. 8 shows the coding tree corresponding to a macroblock partitioned as shown in FIG. 3. If 15 different displacement vectors have been selected, there are 16 different nodes, with a special codeword for the roots; hence 4 bits are necessary; consequently the tree, which has 17 nodes, leads to a number of bits, 17×4=68 bits.

The French Patent Application No. 89 08547 in the name of the Applicant describes in more detail a procedure for analyzing the field of motion and for allocating codes corresponding from coding trees corresponding to the partitioning into quadrants and the corresponding adjustment when the required throughput is exceeded, equally applicable to the coding and to the adjustment of the field of motion such as results from the estimation method described above.

The results obtained by following such a hierarchical motion estimation method associated with a "quadtree" coding technique have been evaluated for television signals resulting from an interlaced analysis. The motion estimation is performed for each even raster and this motion information is coded and transmitted for the odd rasters. At reception, after decoding the motion information, the odd rasters are interpolated from the even rasters and from the motion information.

Three types of sequences have been tested, one corresponding to the very rapid motion of an image element, another corresponding to a sequence of images including elements possessing varied motions, rapid motions and slower motions, and a sequence of images corresponding to a zoom into a very fine drawing. The results obtained are compatible with the throughputs provided in digitally assisted television chains.

The important advantages which result from the method for estimating and coding the motion of sequences of images are the following:

At a given level, the processing of a block is independent of that of the other blocks and only the displacement vectors of the neighbourhood defined at the preceding level are used as initial values. Moreover, the tree-partitioning of the field of motion may be rapidly constructed since it uses a structure already in existence at the end of the motion estimation.

This method for estimation motion can be parametrized as required to be suited to the various functions of the transmission chain. In fact, the size of the block of minimum dimension and the maximum throughput are variable parameters. The possibility of obtaining a displacement vector for each pixel, that is to say a point field of motion vectors, has even been tested. To do this, it is assumed that all the motion vectors of the actual field of motion of the image belong to the final field of motion resulting from the estimator after a priori determination of the fields of motion of the various levels, that is to say the estimation is not performed at a level finer than that of the 8×8 blocks. Then, for each pixel, the vector which leads to the lowest inter-raster difference is selected in this field of motion. This vector is then an element of the point field of motion.

The estimation device according to the invention, within the scope of those skilled in the art, is not shown since it principally comprises memories for images of the sequence, calculation means and storage memories for the intermediate results and for the final results. It must however be noted that implementation of the method for estimating motion according to the invention is facilitated by the fact that the calculations, for the various macroblocks of a raster (typically 108), then at each intermediate level, may be performed in parallel since, as indicated above, the calculations for a block at a given level use only the values already calculated at the preceding level. Similarly, in a given level the four separate estimations performed for each of the blocks from four different initial values may be performed in parallel since they are independent. Parallelization of the estimation device may therefore be significant provided that the calculation means permit it.

Finally, the motion estimator may feed each item of equipment of the studio which needs the motion information or the coded motion information.

I claim:

1. A method for estimating and hierarchically coding the motion of sequences of images, comprising the steps of:

at a first step, partitioning a current image into $2^{p+1}\times 2^{p+1}$ pixel macroblocks, where p is an integer, and determining first field of motion vectors, which is associated with this partition into macroblocks, by using an iterative and recursive estimation algorithm initialized by field of motion vectors estimated for a preceding image;

at a second step, partitioning into quadrants each of the macroblocks and determining, for the blocks which result therefrom, second field of motion vectors by using the interactive and recursive estimation algorithm but initialized by vectors from the field of motion vectors which were estimated at the preceding level;

at an ith step, i=3 to D, where n is an integer, partitioning each of the blocks of the i−1 level into quadrants and determining, for the blocks which result therefrom, an ith field of motion vector by using the iterative and recursive estimation algorithm initialized by vectors from the field of motion vectors which were estimated at the preceding level, the blocks of minimum size being $2^{l+1}\times 2^{l+1}$ pixel blocks, where l is an integer;

determining a final motion vector field from the n resulting field of motion vectors by choosing a lowest level of partition for which the field of motion vector associated with the corresponding block leads to a minimization of a criterion reflecting differences of brightness between blocks communicating in the successive images via the estimated displacement vectors.

2. The method according to claim 1, wherein the iterative calculations applied at a given level are performed in parallel, the calculations of a given level taking their initialization values at a preceding level.

3. The method according to claim 1, wherein p is equal to 5 and 1 equal to 2, the macroblocks being 128×128 pixel blocks and the blocks of minimum size being 8×8 pixel blocks, the estimation method being hierarchically structured into 5 levels.

4. The method according to claim 1, wherein a point field of motion is established from a final field of motion vector by allocating to each pixel the motion vector of the final field for which an interraster brightness difference between this pixel and the pixel displaced by the corresponding motion vector in the preceding raster is minimized.

5. The method according to claim 1, wherein the iterative and recursive estimation algorithm used is symmetric and uses, for the determination of a field of motion vector at the iteration rank i, the motion vector determined at the iteration i−1 less sums of differences of brightness between pixels of the current block and pixels of blocks corresponding to the current block which are displaced by the field of motion vector, in the preceding raster and in the following raster of the sequence respectively.

6. The method according to either one of claims 1 or 5, wherein for each block, the iterative and recursive estimation algorithm is applied four times, initialized by four field of motion vectors respectively associated at the first step, with four blocks of lower level constituting each macroblock, taken from the second level field of motion vectors of the preceding image, in the following steps, with four blocks of the preceding level belonging to a neighborhood of the current block, in the same image, and in that the vector chosen from the four result vectors to form one of the vectors of the corresponding field of motion is that which leads to the minimization of the criterion reflecting the differences of brightness between blocks communicating in the successive images via the corresponding estimated displacement vectors.

7. The method according to claim 6, wherein the four motion vectors for initializing the blocks of the preceding level which are used as initial values for the estimation of a current block are the vector associated with the block of a preceding level from which it issues, and the three vectors associated with the blocks of the preceding level which are adjacent to this current block.

8. The method according to claim 6, wherein the four motion vector calculations performed for each block are performed in parallel, these calculations taking their initialization values at a preceding level.

9. The method according to either of claims 1 or 5, wherein the final, hierarchical field of motion vector is directly associated with a coding tree of a quadtree type, corresponding to the hierarchy of the blocks and of the corresponding motion vectors of the various levels selected for the final field of motion sector, and in that an adjustment of the resulting coding throughput is performed by selecting the final field of motion vector suited to a required throughput.

10. The method according to claim 9, wherein the adjustment is performed, when the required throughput is exceeded, by eliminating from the final field of motion vector, least frequent vectors and by replacing them by the closest vectors of greater frequency.

11. The method according to claim 9, wherein the adjustment is performed, when the required throughput is exceeded, by removing the vectors of the field of motion which is associated with the blocks of minimum size from the selection of the final field of motion vector.

* * * * *